United States Patent
Shenoy

(10) Patent No.: US 10,963,514 B2
(45) Date of Patent: Mar. 30, 2021

(54) USING RELATED MENTIONS TO ENHANCE LINK PROBABILITY ON ONLINE SOCIAL NETWORKS

(71) Applicant: Facebook, Inc., Menlo Park, CA (US)

(72) Inventor: Rajesh Krishna Shenoy, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 575 days.

(21) Appl. No.: 15/827,622

(22) Filed: Nov. 30, 2017

(65) Prior Publication Data

US 2019/0163836 A1 May 30, 2019

(51) Int. Cl.
*G06F 16/00* (2019.01)
*G06F 16/901* (2019.01)
*G06Q 50/00* (2012.01)
*G06F 16/951* (2019.01)
*G06F 16/2457* (2019.01)

(52) U.S. Cl.
CPC .... *G06F 16/9024* (2019.01); *G06F 16/24578* (2019.01); *G06F 16/951* (2019.01); *G06Q 50/01* (2013.01)

(58) Field of Classification Search
CPC ........... G06F 16/9024; G06F 16/24578; G06F 16/951; G06Q 50/01
USPC ........................................................ 707/748
See application file for complete search history.

(56) References Cited

U.S. PATENT DOCUMENTS

| | | |
|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,593,940 B2 * | 9/2009 | Gruhl ............... G06F 16/951 |
| 7,752,326 B2 | 7/2010 | Smit |
| 7,783,630 B1 | 8/2010 | Chevalier |
| 7,797,635 B1 | 9/2010 | Denise |
| 7,836,044 B2 | 11/2010 | Kamvar |
| 7,840,589 B1 | 11/2010 | Holt |
| 8,024,328 B2 | 9/2011 | Dolin |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |

(Continued)

*Primary Examiner* — Monica M Pyo
(74) *Attorney, Agent, or Firm* — Jordan IP Law, LLC

(57) ABSTRACT

In one embodiment, a method includes accessing a mention table of entries that each have: (1) a string, (2) a count of a number of times the string is used in a corpus, and (3) a count of a number of times the string is linked to another document. The method also includes calculating, for each n-gram of a search query from a querying user, a link probability that represents the likelihood that the n-gram corresponds to an entity associated with a communication network. The method also includes identifying content objects that match the search query and ranking the content objects based at least in part on on the calculated link probability. The method also includes sending instructions to present the search results on a client system of the querying user.

20 Claims, 8 Drawing Sheets

(56) References Cited

U.S. PATENT DOCUMENTS

| | | |
|---|---|---|
| 8,185,558 B1 | 5/2012 | Narayanan |
| 8,209,330 B1 | 6/2012 | Covell |
| 8,239,364 B2 | 8/2012 | Wable |
| 8,244,661 B1 | 8/2012 | Komissarchik |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 9,015,733 B2 | 4/2015 | Schrock |
| 9,223,899 B2 | 12/2015 | Singh |
| 9,342,605 B2 | 5/2016 | Richter |
| 9,400,822 B2 | 7/2016 | Schrock |
| 9,436,760 B1* | 9/2016 | Tacchi ............... G06F 16/3344 |
| 9,576,060 B2 | 2/2017 | Singh |
| 9,646,028 B2 | 5/2017 | Schrock |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2006/0218111 A1 | 9/2006 | Cohen |
| 2007/0174304 A1 | 7/2007 | Shrufi |
| 2007/0192293 A1 | 8/2007 | Swen |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0222348 A1 | 9/2009 | Ransom |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0271374 A1 | 10/2009 | Korn |
| 2009/0276414 A1 | 11/2009 | Gao |
| 2009/0281988 A1 | 11/2009 | Yoo |
| 2009/0287682 A1* | 11/2009 | Fujioka ............... G06Q 30/02 |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0250526 A1 | 9/2010 | Prochazka |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0270815 A1* | 11/2011 | Li ..................... G06F 40/30 707/706 |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0054640 A1* | 2/2013 | Najork ............... G06F 16/2457 707/770 |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |

(56) References Cited

U.S. PATENT DOCUMENTS

| | | |
|---|---|---|
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0212081 A1 * | 8/2013 | Shenoy .............. G06F 16/951 707/706 |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0280080 A1 | 9/2014 | Solheim |
| 2014/0304429 A1 | 10/2014 | Softky |
| 2015/0074289 A1 | 3/2015 | Hyman |
| 2015/0161519 A1 | 6/2015 | Zhong |
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1 | 2/2016 | He |
| 2016/0042067 A1 | 2/2016 | Weng |
| 2016/0063093 A1 | 3/2016 | Boucher |
| 2016/0063115 A1 | 3/2016 | Ayan |
| 2016/0162502 A1 | 6/2016 | Zhou |
| 2016/0203238 A1 | 7/2016 | Cherniavskii |
| 2017/0046390 A1 | 2/2017 | Jain |
| 2017/0083523 A1 | 3/2017 | Philip |
| 2017/0103110 A1 | 4/2017 | Winstanley |
| 2017/0139920 A1 | 5/2017 | Ball |
| 2017/0147696 A1 | 5/2017 | Evnine |
| 2017/0185603 A1 | 6/2017 | Dentel |
| 2017/0199905 A1 | 7/2017 | Ott |
| 2017/0199927 A1 | 7/2017 | Moore |
| 2017/0201851 A1 | 7/2017 | Huang |
| 2017/0206250 A1 | 7/2017 | Loomans |
| 2017/0206271 A1 | 7/2017 | Jain |
| 2017/0308583 A1 | 10/2017 | Husain |

* cited by examiner

USING RELATED MENTIONS TO ENHANCE LINK PROBABILITY ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may determine whether a given string in a query or post should be linked to an entity associated with the online social network. Considering that there may be billions of entities to analyze, it may be technically challenging to determine whether one or more of the words in a particular query or post to the online social network are intended to reference a particular entity. As an example and not by way of limitation, if a user posts "Good Morning America!", this post could merely be an enthusiastic salutation, or it could be a reference to the morning television show on ABC. To make this and similar determinations, the social-networking system may maintain a mention table, which may be a structured data set whose entries correspond to documents in a corpus. The documents may contain text strings that link to other documents in the corpus. For each document in the corpus, there may exist a separate entity in the mention table. To ensure that the appropriate strings are linked to entities on the online social network, the social-networking system may use a technique called link probability. This process may be performed whenever a string in a post or search query matches an entity in the mention table. In particular embodiments, a link probability equation may be the number of times a particular string in a corpus of documents links to another document in the corpus, divided by the number of times the particular string appears in the corpus. If the link probability for a particular string is over a threshold probability, the social-networking system may determine to link the string to an entity associated with the social-networking system. If the link is below the threshold probability, the social-networking system may determine that the string is not associated with any entity.

In cases where a user inputs text intending to reference an entity but does not use the precise text of that entity as it appears in the mention table, the social-networking system may use a technique called related mentions. As an example and not by way of limitation, a user may post "I just saw obama at starbucks!" By inputting the string "obama," the user likely intends to reference former President Barack H. Obama, who may be associated with a user account on the online social network with the name string "Barack H. Obama". The string "obama" may have an entry in the mention table, but may have a low link probability (e.g., it may appear in the corpus 1,000 times, but only link to another document 1 time, giving it a link probability of $\frac{1}{1000}$=0.001). But in most cases the string "obama" is likely to be intended to reference Barack H. Obama, even when the string itself is not linked to that entity. The social-networking system may use the technique of related mentions to access the entries in the mention table which contain the string "obama." Such entries may be the strings "Barack Obama," "Barack H. Obama," "Barry Obama," and "President Obama." Each of these entries may be mentioned in the corpus and may be linked to another document in the corpus, such as the profile page for President Barack H. Obama. The social-networking system may take these related mentions into consideration when calculating the link probability for the string "obama," increasing the link probability from its relatively low base probability (e.g., 0.001) to a higher probability (e.g., 0.456) based on the related mentions. The social-networking system may modify the link probability for a string by add the number of links to the numerator of the link probability equation and the number of mentions to the denominator of the link probability equation. These related mentions may raise the link probability to above the threshold probability.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
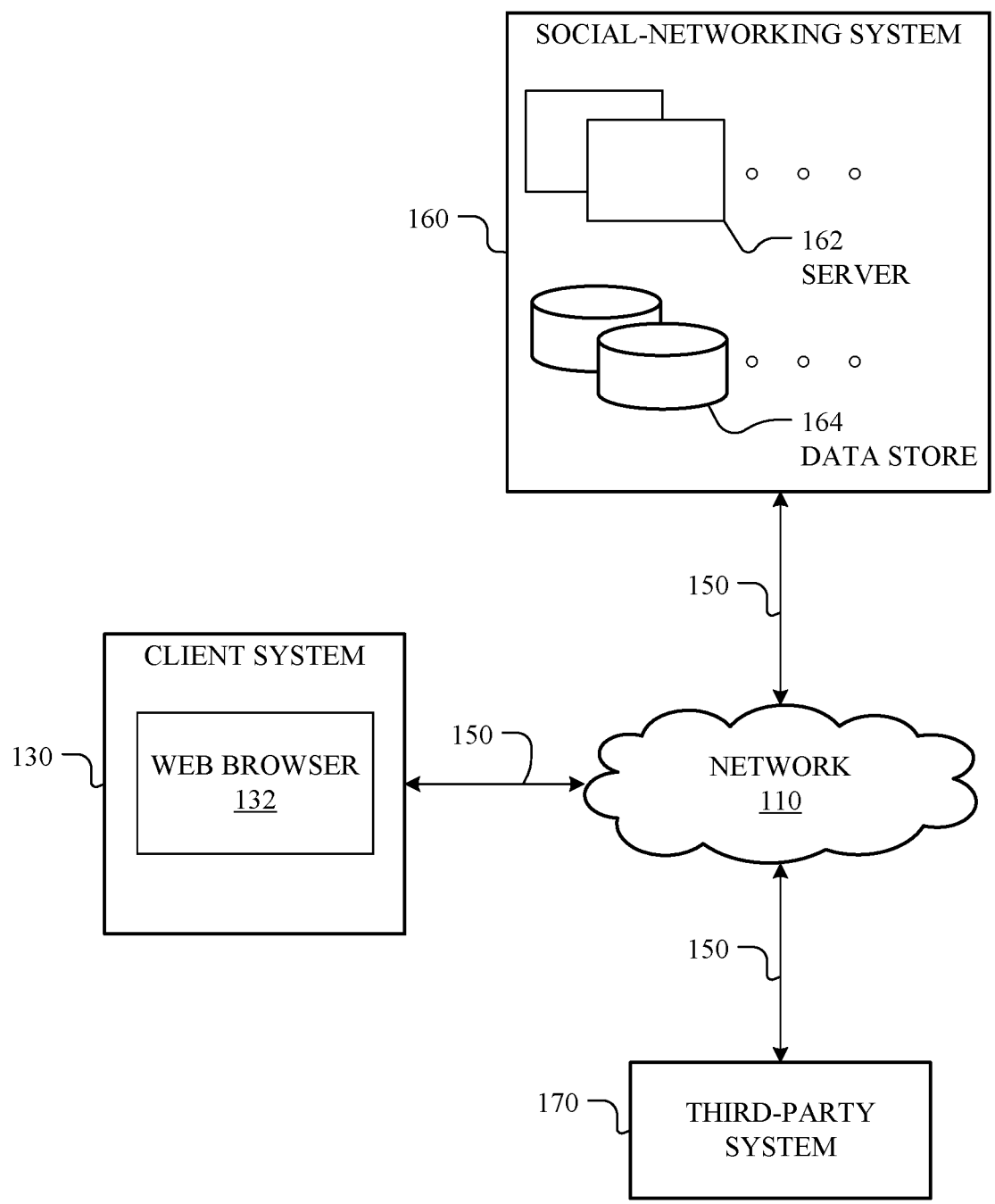
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
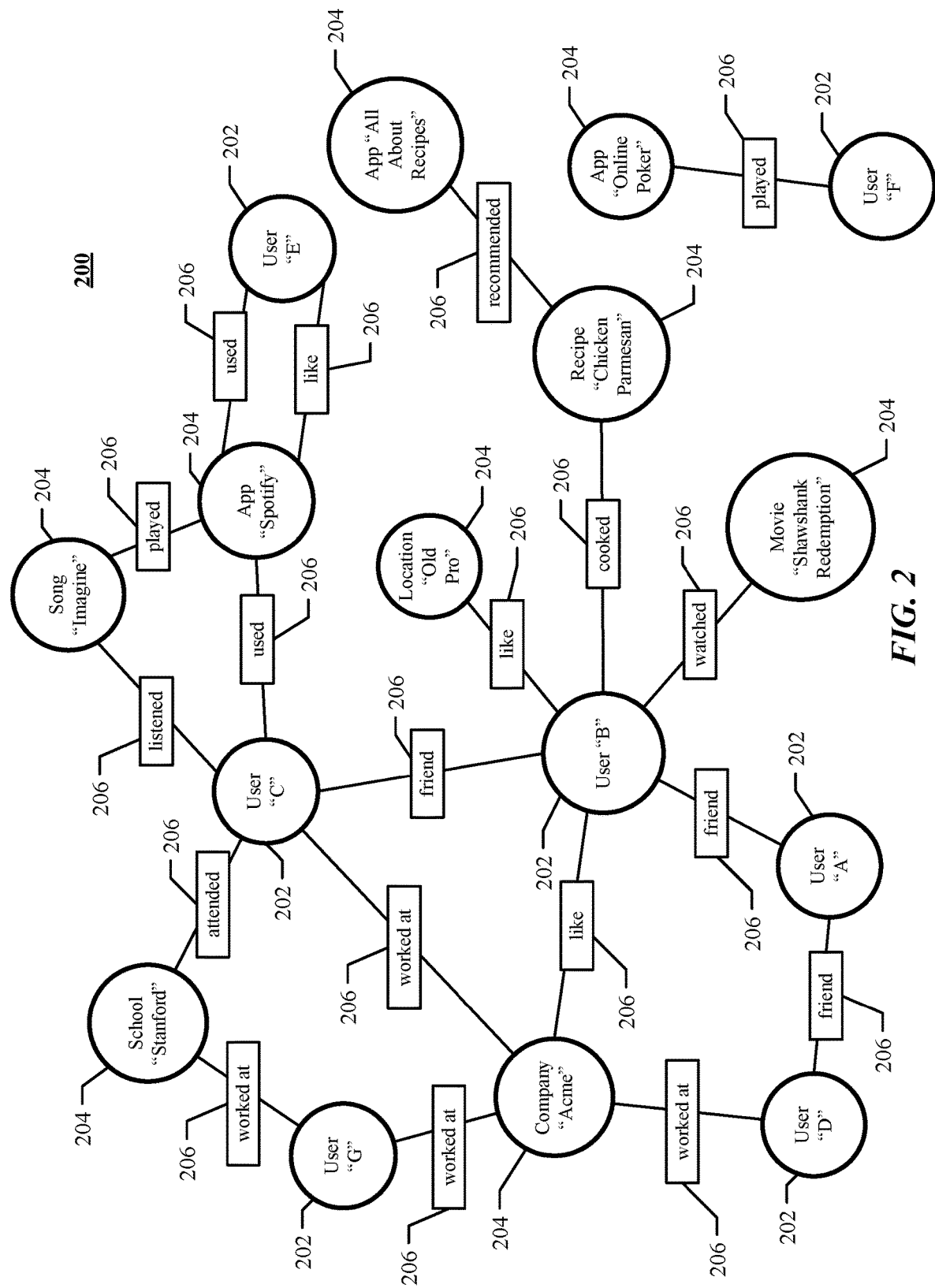
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, the social-networking system 160 may receive, from a client system of a user of an online social network, a query inputted by the user. The user may submit the query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Using Related Mentions to Enhance Link Probability

In particular embodiments, the social-networking system 160 may determine whether a given string in a query or post should be linked to an entity associated with the online social network. Considering that there may be billions of entities to analyze, it may be technically challenging to determine whether one or more of the words in a particular query or post to the online social network are intended to reference a particular entity. An entity may be anything with distinct and independent existence. An entity may be a human, alive or dead and regardless of whether the human is a user of the social networking system, an organization or enterprise, a country, an activity (e.g., kite-surfing, calculus), or any other suitable thing. As an example and not by way of limitation, a user may inputs text that includes the phrase "good morning is a great sound track." Although it may be clear to a human that the user is referencing a musical sound track, it may be difficult for a computer to recognize that "good morning" references something other than a daybreak salutation. To properly classify this string and make other similar determinations, the social-networking system may use "related mentions" to enhance the computer's ability to predict whether a given n-gram is intended to refer to an entity.

The social-networking system may maintain a mention table, which may be a structured data set whose entries correspond to documents in a corpus. The documents may contain text strings that link to other documents in the corpus. For each document in the corpus, there may exist a separate entity in the mention table. To ensure that the appropriate strings are linked to entities on the online social network, the social-networking system may use a technique called link probability. This process may be performed whenever a string in a post or search query matches an entity in the mention table. In particular embodiments, link probability may be the number of times a particular string in a corpus of documents links to another document in the corpus, divided by the number of times the particular string appears in the corpus. If the link probability for a particular string is over a threshold probability, the social-networking system may determine to link the string to an entity associated with the social-networking system. If the link is below the threshold probability, the social-networking system may determine that the string is not associated with any entity.

In cases where a user inputs text intending to reference an entity but does not use the precise text as it appears in the mention table, the social-networking system may use a technique called related mentions. Using related mentions may involve calculating the link probability for not only the given n-gram, but also for related n-grams. The link probabilities for the given n-gram and the related n-grams are then used to determine a link probability for the given input text. As an example and not by way of limitation, a user may post "I just saw obama at starbucks!" By inputting the string "obama," the user intends to reference former President Barack H. Obama, who may be associated with a user account on the online social network with the name string "Barack H. Obama". The string "obama" may have an entry in the mention table, but may have a low link probability (e.g., it may appear in the corpus 1,000 times, but only link to another document 1 time, giving it a link probability of $\frac{1}{1000}=0.001$). But in most cases the string "obama" is likely to be intended as a reference to the entity Barack H. Obama, even when the string itself is not linked to that entity. The social-networking system may use the technique of related mentions to access the entries in the mention table which contain the string "obama." The social-networking system may take these related mentions into consideration when calculating the link probability for the string "obama," increasing the link probability from its relatively low base probability (e.g., 0.001) to a higher probability (e.g., 0.456) based on the related mentions. The social-networking system may modify the link probability for a string by add the number of links to the numerator of the link probability equation and the number of mentions to the denominator of the link probability equation. These related mentions may raise the link probability to above the threshold probability.

Figure 3:
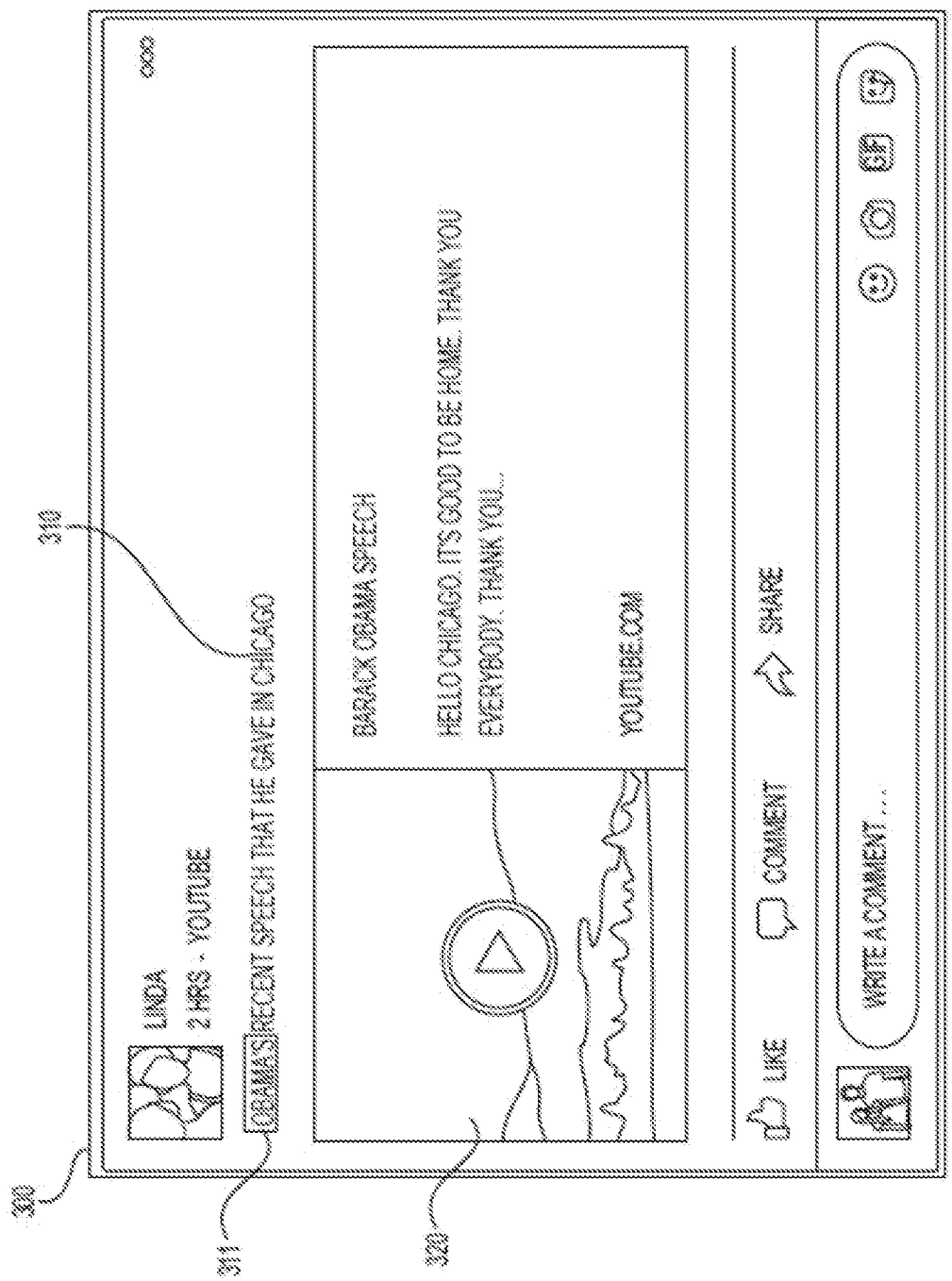
FIG. 3 illustrates an example post to an online social network.

FIG. 3 illustrates an example post 300 to an online social network. Post 300 may have been generated (i.e. posted) by a user of the online social network named Linda. Post 300 may include a status update 310 and a content object 320. In this example, content object 320 is a YOUTUBE video of a speech given by Barack Obama. Status update 310 may state "Obama's recent speech that he gave in Chicago." Status update 310 may include a link 311 that is associated with the text "Obama," where the link points to the profile page for President Barack H. Obama. Link 311 may not be visible to other users of the online social network (e.g., it may be a metadata tag on the text), but it may be used by the social-networking system 160 for searching and ranking purposes in search results in future search queries by other users. In particular embodiments, the social-networking system 160 may uprank posts that contain links to entities because users may be more likely to interact with posts that link to entities such as videos, people, or businesses (e.g., YOUTUBE). As an example and not by way of limitation, sometime after Linda's post about Obama's speech, another user may input a search query that states: "obama," or "obama speech." Using the methods discussed herein, the social-networking system 160 may determine that the n-gram "obama" in the query refers to an entity. The social-networking system may then search for content objects (including posts, photos, videos, etc.) that match the search query (e.g., content that contains the word "obama"). Post 300 may be included in the search results. Because (1) the search query contained an n-gram that referred to an entity, and (2) status update 310 includes a link 311 to an entity, post 300 may be upranked in the search results over posts or other content objects that do not link to entities. Although this disclosure describes linking and searching for a particular content object of an online social network in a particular manner, this disclosure contemplates linking and searching for any suitable content object of an online social network in any suitable manner.

Figure 4:
FIG. 4 illustrates another example post to an online social network.

FIG. 4 illustrates another example post 400 to an online social network. Post 400 may have been shared by a user of the online social network named Andrew. Post 400 may include text 410 that says "Good Morning ☺ " and a content object 420, which in this example is a video of a panda bear rolling around in the snow. FIG. 4 may provide a contrast to FIG. 3 in that the text "Good Morning" is not linked to any particular entity. The presence or lack of links to entities in content objects (including posts) may aid the social-networking system 160 in returning more relevant search results. If a user inputs a search query that does not refer to an entity, the social-networking system 160 may uprank content objects that also do not refer to an entity. In particular embodiments, the social-networking system 160 may uprank posts that do not contain links to entities when a search query does not refer to an entity because users may be more likely to interact with posts that do not link to entities when their search queries do not refer to entities (e.g., because the user is searching for a topic that does not necessarily correspond to a particular entity). As an example and not by way of limitation, sometime after post 400 was posted, another user may input a search query that states: "Good morning." Using the methods discussed herein, the social-networking system 160 may determine that the n-gram "good morning" does not refer to an entity. The social-networking system 160 may search for content objects (including posts, photos, videos, etc.) that match the search query. Post 400 may be included in the search results. Because (1) the search query did not contain any n-grams that referred to an entity, and (2) text 410 did not include a reference to an entity, post 400 may be upranked in the search results over posts and other content objects that do link to entities. Although this disclosure describes searching for a particular content object of an online social network in a particular manner, this disclosure contemplates searching for any suitable content object of an online social network in any suitable manner.

In particular embodiments, the social-networking system 160 may receive text input from a client system 130 associated with a user of an online social network. The text input may be a search query or a post to the online social network. As an example and not by way of limitation, the input text may include one or more n-grams that state "good morning is a great sound track." As another example, the input text may state "I just saw obama at starbucks!" As another example, the input text may be a search query that merely states "Watts." Although this disclosure describes receiving input text in a particular manner, this disclosure contemplates receiving input text in any suitable manner.

In particular embodiments, the social-networking system 160 may access a mention table. The mention table may include several entries. Each entry may be a string of text that corresponds to a document in a corpus of documents. The corpus of documents may be any suitable corpus and may be maintained either by the social-networking system 160 or by a third-party entity. As an example and not by way of limitation, the corpus may be maintained by WIKIPEDIA and may contain over 5 million documents. The documents may be related to any suitable topic, such as Barak H. Obama, Budweiser, the San Francisco 49ers, kite-surfing, Medieval stone churches in Finland, or Hurricane Katrina. As another example and not by way of limitation, the corpus may be an internal set of content objects on the online social network, such as a set of posts and comments by users posted in the past 30 days (which may be over 100 billion posts). These internal posts may link to profile pages for various entities, such as those mentioned above. The mention table may also comprise, for each entry, (1) a count of the number of times the string appears in the corpus, and (2) a count of the number of times the string is linked to another document in the corpus of documents. When a particular string appears in the corpus, it may be referred to as a "mention." For example, if the string "Harry Potter" appears in the corpus 348 times, the number of mentions in the corpus for Harry Potter may be 348. If the string "Harry Potter" is also linked to another document (e.g., the profile page for the Harry Potter book series) in the corpus 334 times, the number of links for "Harry Potter" may be 334. In particular embodiments, each entry in the mention table may also include a count of the number of times the string is linked in the corpus of documents to a particular entity of the online social network. This may appear as another column in the mention table and may be included in a mention table for a corpus that is maintained by the social-networking system 160 rather than a third-party entity. A corpus maintained by the social-networking system 160 may be a compilation of posts, including comments, provided by users of the online social network. Alternatively, a corpus maintained by the social-networking system 160 may be a compilation of user and entity profiles that have been created in association with the online social network. Shown below is an example portion of an example mention table maintained by a third-party entity. The entries may be normalized such that all letters are lowercase.

TABLE 1

Example Portion of an Example Mention Table

| String | Number of mentions | Number of Links |
|---|---|---|
| "obama" | 1000 | 1 |
| "barack obama" | 500 | 250 |
| "barack h. obama" | 50 | 45 |

TABLE 1-continued

Example Portion of an Example Mention Table

| String | Number of mentions | Number of Links |
|---|---|---|
| "barry obama" | 5 | 0 |
| "president obama" | 570 | 2 |
| "president barack obama" | 100 | 90 |
| "44th u.s. president" | 11 | 10 |
| Total | — | 456 |

In particular embodiments, each entry in the mention table may correspond to a different document in the corpus of documents. Each document in the corpus may correspond to a particular entity associated with the online social network. To use the above example portion of a mention table, there may be a document that corresponds to the string "Obama," a separate document that corresponds to the string "Barack Obama," another document that corresponds to the string "Barack H. Obama," and so on. In particular embodiments, the same document may contain multiple strings that are entries in the mention table. As an example and not by way of limitation, a single document may contain the string "Obama" and "Barack Obama." In particular embodiments, a string may be mentioned when it appears in a different string that has an entry in the mention table. As an example and not by way of limitation, the string "Barack Obama" may be counted as a reference for the entry "barack obama," and may also be counted as a reference for the entry "obama." In particular embodiments, each entry in the mention table may correspond to a different entity associated with the online social network. This may be appropriate when the entries in the mention table are sufficiently different, such as "Barak Obama," "Budweiser," "the San Francisco 49ers," "kite-surfing," "Medieval stone churches in Finland," or "Hurricane Katrina." However, if the entries are similar, it may be unlikely that similar entries correspond to different documents or entities. As an example and not by way of limitation, it is unlikely that "Obama," "Barack Obama," and "Barack H. Obama" may all refer to different entities or documents in a corpus. Thus, in particular embodiments, two or more entries may correspond to the same document in the corpus of documents or to the same entity associated with the online social network. As an example and not by way of limitation, all the entries in the above portion of a mention table may correspond to the same entity: "Barack H. Obama." Although this disclosure describes providing a particular mention table in a particular manner, this disclosure contemplates providing any suitable mention table in any suitable manner.

Figure 5:
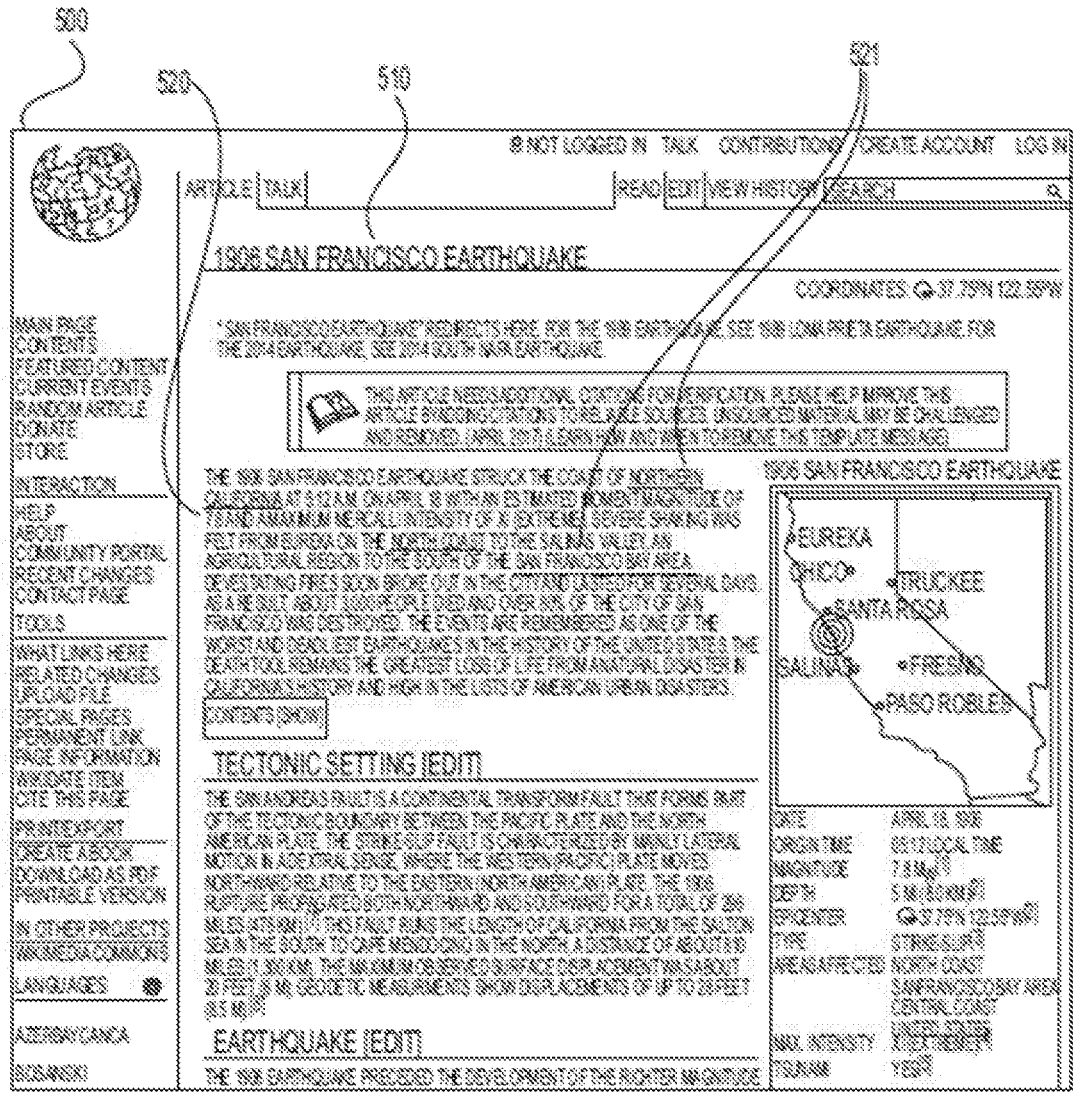
FIG. 5 illustrates an example document in a corpus that includes links to other documents.

FIG. 5 an example document 500 in a corpus that includes links to other documents. Document 500 may be maintained by a third-party such as WIKIPEDIA or may be maintained by the social-networking system 160. Document 500 may include title 510, body text 520, and links 521. In the example document 500 is titled "1906 San Francisco Earthquake", links 521 include links to "Northern California" and "San Francisco Bay Area." Links 521 may link to other documents in the corpus. As an example and not by way of limitation, the string "San Francisco Bay Area" may link to another document in the corpus titled "San Francisco Bay Area." Links 521 may also be mentions of the particular entity. As an example and not by way of limitation, when determining the number of mentions the string "San Francisco Bay Area" has in the corpus, the text "San Francisco Bay Area" counts as a mention even though the text also links to another document. Thus, this particular text counts both as a mention and as a link. In particular embodiments, if the corpus is maintained by the social-networking system 160, the "document" may be an entity of the online social network. In this scenario, the entity may be represented as a web resource that may or may not appear similar to document 500. As an example and not by way of limitation, if the entity represents the city of Portland, Oreg. and the corpus is maintained by the social-networking system 160, the entity may be an official web resource for Portland. The web resource may show a picture of Portland's cityscape as well as several recommended places to visit in Portland. Although this disclosure describes a particular document having a particular set of features, this disclosure contemplates any suitable document having any suitable set of features.

In particular embodiments, the entity linked in the mention table may be an entity associated with the online social network and have a unique canonical ID. Alternatively, two or more entries in the mention table may be associated with the same entity and share a canonical ID. As an example and not by way of limitation, the entry "Warriors" and the entry "Golden State" may each correspond to the entity Golden State Warriors (an NBA basketball team) and may share the same canonical ID. The canonical ID may be any suitable string of numbers, letters, symbols, or a combination of letters, numbers, and symbols to uniquely identify an entity. As an example and not by way of limitation, the canonical ID for the Golden State Warriors may be P7834DK422. In particular embodiments, an entity linked in the mention table may be associated with a node in the social graph 200. The node may be connected to user node of the user by an edge. The edge may have an edge type that indicates a type of relationship between the user and the entity. The edge may also be associated with an affinity coefficient that represents the strength of a relationship between the user and the entity, as discussed herein. As an example and not by limitation, the Golden State Warriors may be represented by a node in the social graph 200. A user node corresponding to the user may be connected by an edge to the node corresponding to the Golden State Warriors. The edge may correspond to particular actions the user has taken on the online social network with respect to the Golden State Warriors. As examples, the user may have followed the profile page for the Golden State Warriors. Although this disclosure describes providing particular entries in a mention table in a particular manner, this disclosure contemplates providing any suitable entries in a mention table in any suitable manner.

In particular embodiments, in response to receiving the text input, the social-networking system 160 may search the mention table to identify one or more entries that correspond to one or more strings that match the n-grams of the text input (e.g., search query or post). This search may be performed using any suitable search techniques, including string matching, vector space models, probabilistic relevance models, latent Dirichlet allocation, or any other suitable model. In particular embodiments, for a string in an entry to correspond to an n-gram of the text input, an exact symbol match may be required. As an example and not by way of limitation, the input texts "obama," "Obama," and even "ObAmA" would correspond to a mention table entry for "obama," but the input text "omaba" would not correspond to a mention table entry for "obama."

In particular embodiments, the social-networking system 160 may calculate, for each n-gram of the search query that matches an entry in the mention table, a link probability for the n-gram. The link probability may represent a likelihood that the n-gram corresponds to a document in the corpus. The calculated link probability may either be a preliminary link probability or a final link probability. In particular embodiments, a preliminary link probability may be calculated as the number of times a particular string in a corpus of documents links to another document in the corpus divided by the number of times the particular string appears in the corpus. This may be expressed mathematically as:

$$P_l = N_{links}/N_{mentions} \quad (1)$$

The variable $N_{links}$ may be the count of the number of times the string is linked to a document in the corpus of documents. The variable $N_{mentions}$ may be the count of the number of times the string is mentioned in the corpus. As an example and not by way of limitation, string "good morning" may appear 1,000 times in a corpus. Of those 1,000 mentions, twenty may link to another document. Thus, the link probability for "good morning" may be $$P_l = N_{links}/N_{mentions} = \frac{20}{1,000} = 0.020.$$

In particular embodiments, link probability may be calculated as the number of times a particular string links to another document in the corpus divided by the number of documents in which the particular string appears. This may be expressed mathematically as:

$$P_l = N_{links}/N_{docs} \quad (2)$$

The variable $N_{links}$ may be the count of the number of times the string is linked to a document in the corpus of documents. The variable $N_{docs}$ may be the count of the number of documents in which the string appears in the corpus of documents. As an example and not by way of limitation, string "good morning" may appear in 1,985 documents in the corpus. Also, the string "ninja" may link twenty times to other documents. Thus, the link probability for "ninja" may be $$P_l = N_{links}/N_{docs} = \frac{35}{1,985} = 0.018.$$

Link probability may be used do estimate whether input text is intended to refer to a particular entity. Making this estimation may involve determining whether the link probability is above a threshold probability. If the link probability is above the threshold, the social-networking system 160 may determine that the corresponding n-gram was intended by the user to refer to an entity. Although this disclosure describes a calculating link probability in a particular manner, this disclosure contemplates calculating a link probability in any suitable manner.

Sometimes a user may intend to refer to an entity when entering input text such as a search query or a post to an online social network, but does not use the entity's proper name. In this case the n-gram may still match an entry in the mention table. However, if the social-networking system 160 uses either of the above formulas, the social-networking system 160 may make an incorrect determination that the n-gram is not intended to refer to an entity. As an example and not by way of limitation, a user may post "I just saw obama at starbucks!" The n-gram "obama" is likely intended to refer to the entity Barack H. Obama. However, the link probability for the n-gram "obama" is likely to be low because most links to the entity Barack H. Obama may correspond to strings that use the full terminology "Barack H. Obama." This may be because documents in the corpus may generally use the string "Barack H. Obama" when linking to a document corresponding to "Barack H. Obama," as opposed to using strings like "Obama," "Barry Obama," or "44th U.S. President." To illustrate this problem, consider Table 1 above. The n-gram "obama" may appear 1,000 times in the corpus. Thus, $N_{mentions}$ may be 1,000. But "obama" itself may only link to another document a single time. Thus, $N_{links}$ may be 1. Thus, $P_l$ may be $$N_{links}/N_{mentions} = \frac{1}{1,000} = 0.001,$$

which may be under the threshold probability. This may cause the social-networking system 160 to mistakenly determine that "obama" is not intended to refer to an entity.

To overcome this problem, in particular embodiments the social-networking system 160 may take into consideration mentions and links of strings that are similar to the n-gram in question. In particular embodiments, the preliminary link probability may be adjusted to become a final link probability:

$$P_f = (N_{links} + N_{co\text{-}links})/(N_{mentions} + N_{co\text{-}mentions}) \quad (3)$$

The variable $N_{co\text{-}links}$ may be a count of a number of times one or more second strings similar to the first string are linked to the particular document in the corpus of documents. The variable $N_{co\text{-}mentions}$ may be a count of the number of times one or more second strings similar to the first string are mentioned in the corpus of documents. Referring back to Table 1 and using the example of the text input "I just saw obama at starbucks!" Assume that the n-gram under consideration is "obama." The social-networking system 160 needs to determine if the string "obama" is intended by the user who input the text to refer to an entity on the online social network. As discussed above, using the most simple link probability equation may be insufficient because it provides a link probability of $$P_l = N_{links}/N_{mentions} = \frac{1}{1,000} = 0.001,$$

which may be an inaccurate link probability. However, there are other entries in the mention table of Table 1 that include the string "obama": "Barack Obama" (with 500 mentions and 250 links), "Barack H. Obama" (with 50 mentions and 45 links), "Barry Obama" (with 5 mentions and 0 links), "President Obama" (with 570 mentions and 2 links), and "President Barack Obama" (with 100 mentions and 90 links). Since "obama" is contained in all of these strings, these strings may qualify as "similar." Thus, their respective mention and link counts may be taken into consideration when determining the link probability for the n-gram "obama." Using the final link probability formula $$P_f = (N_{links} + N_{co\text{-}links})/(N_{mentions} + N_{co\text{-}mentions}),$$

along with the link and mention counts for the similar strings in the mention table, the link probability for the n-gram "obama" becomes $$P_l = (1 + 250 + 45 + 0 + 2 + 90)/(1{,}000 + 500 + 50 + 5 + 570 + 100) =$$

$$\frac{388}{2{,}220} = 0.17.$$

In particular embodiments, only the number of co-links may be added to the numerator of the link probability formula. In this scenario, the final link probability for a given n-gram may be $$P_l = (N_{links} + N_{co\text{-}links})/(N_{mentions}) \quad (4)$$

Using the same "obama" example with this new formula, the final link probability may be calculated as:

$$P_l = (1 + 250 + 45 + 0 + 2 + 90)/(1{,}000) = \frac{388}{1{,}000} = 0.388.$$

In particular embodiments, a first string may be similar to a second string if the first string is contained in the second string. As an example and not by way of limitation, a first string "obama" may be considered as similar to the second string "barack obama" because it contains the first string "obama." Another suitable word similarity technique may be to determine the Hamming distance between two strings. Hamming distance between two strings of equal length may be the number of positions at which the corresponding symbols are different. In other words, it may measure the minimum number of substitutions required to change one string into the other, or the minimum number of errors that could have transformed one string into the other. As an example and not by way of limitation, the Hamming distance between "Pablo Picasso" and "Pavlo Pciasso" may be 3. If the two strings are not of equal length, the social-networking system 160 may use a technique called Levenstein distance. The Levenshtein distance between two n-grams is the minimum number of single-character edits (i.e. insertions, deletions or substitutions) required to change one word into the other. Another technique the social-networking system may use is the Damerau-Levenshtein distance, which differs from Levenstein distance by including transpositions among its allowable operations in addition to the three single-character edit operations mentioned previously (insertions, deletions and substitutions). For any of the techniques discussed herein, or for any other suitable technique, the social-networking system may determine that two strings are similar if their distance is below a threshold distance. If the distance is below the threshold distance, the strings may be similar and the social-networking system 160 may take those co-mentions and co-links into consideration when calculating the link probability. In particular embodiments, a first string may be similar to a second string if the first string is an acronym of the second string. As an example and not by way of limitation, a first string "NYC" may be considered as similar to the second string "new york city" because the acronym for "new york city" is the first string "NYC." In particular embodiments, a first string may be similar to a second string if the first string is an expansion of the second string. In particular embodiments, a first string may be similar to a second string if the first string is a stemmed version of the second string. As an example and not by way of limitation, a first string "fist" may be considered as similar to the second string "fishing" because the first string "fish" is a stemmed version of the second string "fishing." In particular embodiments, a first string may be similar to a second string if the first string is a translated version of the second string. As an example and not by way of limitation, a first string "coffee" may be considered as similar to the second string "café" because it is the Spanish translation of the first string "coffee." Although this disclosure describes determining word similarity in a particular manner, this disclosure contemplates determining word similarity in any suitable manner.

Figure 6:
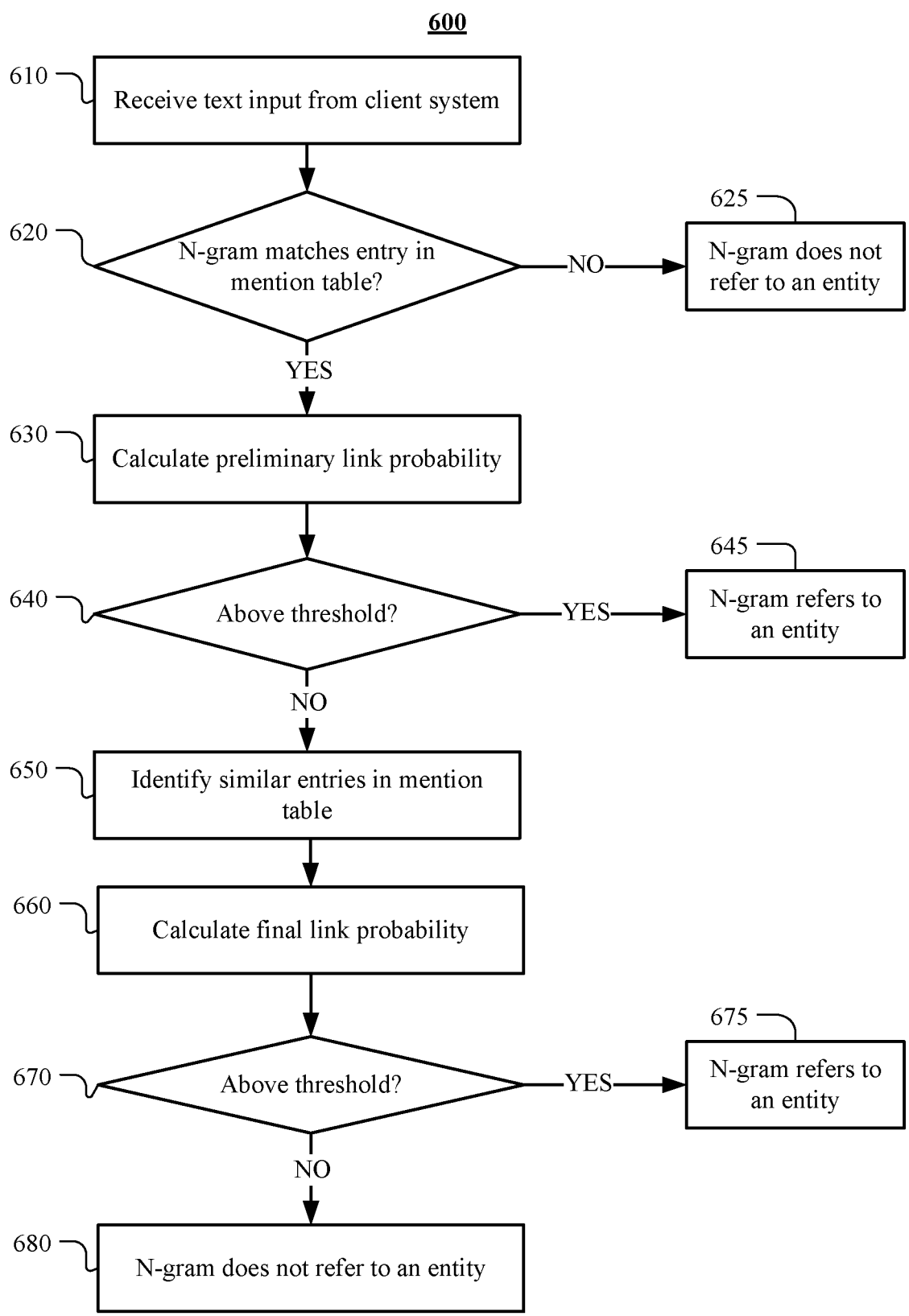
FIG. 6 illustrates an example method for determining whether text input refers to an entity.

FIG. 6 illustrates an example method for determining whether text input refers to an entity. At step 610, the social-networking system 160 may receive text input from a client system 130 of a user of the online social network, as discussed herein. At step 620, the social-networking system 620 may determine whether any n-grams in the text input matches an entry in the mention table. As examples and not by way of limitation, the n-grams "obama" and "good morning" may both match entries in the mention table. The social-networking system 160 may identify n-grams that appear in the mention table and perform the following analysis on each n-gram. If the n-gram matches an entry in the mention table, the method may proceed to step 630. If the n-gram does not match an entry in the mention table, the social-networking system 160 may proceed to step 625 and determine that the text input does not refer to an entity. At step 630, the social-networking system 160 may calculate a preliminary link probability for the n-gram, as discussed herein. At step 640, the social-networking system 160 may determine whether the preliminary link probability is above a threshold probability. As an example and not by way of limitation, the threshold link probability may be 0.50 and the preliminary link probability for the n-gram "barack obama" may be 0.55. Thus, the link probability for "barack obama" may be above the threshold link probability and the social-networking system may proceed to step 645 and determine that the n-gram does refer to an entity. However, if the n-gram is below the threshold, the social-networking system 160 may proceed to step 650. As an example and not by way of limitation, the preliminary link probability for "obama" may be 0.05, which may be below the threshold. At step 650, the social-networking system 160 may identify entries in the mention table that are similar to the n-gram, as discussed herein. For each of the similar entries, the social-networking system 160 may calculate, at step 660, a final link probability using Equations (3) or (4), as discussed herein. At step 670, the social-networking system 160 may determine whether the final link probability is above a threshold probability. The threshold probability of step 670 may be the same as the threshold probability of step 640 or may be a different threshold. As an example and not by way of limitation, the threshold link probability may be 0.65 and the final link probability for the n-gram "obama" may be 0.67. Thus, the final link probability for "obama" may be above the threshold link probability and the social-networking system may proceed to step 675 and determine that the n-gram does refer to an entity. However, if the n-gram is below the threshold, the social-networking system 160 may proceed to step 680 and determine that the n-gram does not refer to an entity.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for determining whether text input refers to an entity including the particular steps of the method of FIG. 6, this disclosure contemplates any suitable method for determining whether text input refers to an entity including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

In particular embodiments, for each n-gram whose link probability is above a threshold (e.g., the threshold for the preliminary link probability or the threshold for the final link probability), the social-networking system 160 may associate the n-gram with an entity on the online social network that corresponds to the entity linked in the mention table. Associating the n-gram with an entity may be done using any suitable method, including adding metadata to the n-gram that provides a link that may or may not be visible to users between the n-gram and a web resource corresponding to the entity. As an example and not by way of limitation, the search query may include the n-gram "sinatra." The social-networking system 160 may determine that "sinatra" appears as an entry in the mention table. The "sinatra" entry in the mention table may correspond to a Frank Sinatra entity on the online social network. The social-networking system 160 may determine that either the preliminary link probability or final link probability is above a threshold probability and thus determine that the n-gram "sinatra" refers to an entity. Because of this determination, the social-networking system 160 may associate the n-gram "sinatra" with the Frank Sinatra entity associated with the online social network. Although this disclosure describes associating an n-gram with an entity in a particular manner, this disclosure contemplates associating an n-gram with an entity in any suitable manner.

In particular embodiments, the social-networking system 160 may identify a plurality of content objects associated with the online social network that match the search query. A content object may comprise any type of object that is posted to or otherwise associated with the online social network. Example content objects include photos, videos, user status updates, comments, geo-tags, a profile page associated with an entity (e.g., a user, a business, a group), user reactions to posts or comments (e.g., "like"), other types of multimedia content or structured documents, or any other suitable object. Content objects or references to content objects may be stored in association with the social graph 200. For a content object to match an n-gram, the content object may need to be related to the n-gram in some way. As an example and not by way of limitation, a querying user may input the text "dat donut" into a search query input field, and the social-networking system 160 may identify a profile page for a business called Dat Donut, a user post that says, "Happy Birthday Shannon! Eat an extra dat donut for me!", a photo with the caption "Dat Big Donut," and other content objects that that are related to the n-grams in the text string "dat donut." As another example and not by way of limitation, a user may input the text "obama" into a search query input field, and the social-networking system 160 may identify an official page for Barack Obama, a photo with the caption "I just saw obama at starbucks!" and other content objects that are related to the n-gram "obama." Although this disclosure describes identifying particular content objects in a particular manner, this disclosure contemplates identifying any suitable content objects in any suitable manner.

In particular embodiments, the social-networking system 160 may rank the content objects based in part on a determination that, for each identified content object, the content object comprises a link to the particular entity of the online social network where the calculated link probability with respect to that particular entity is above a threshold probability. As an example and not by way of limitation, suppose a user enters a search query for "obama." The social-networking system 160 may determine that the link probability for "obama" is above a threshold probability. Thus, the social-networking system 160 may determine that "obama" is intended to refer to an entity. The social-networking system may identify 100 content objects that match the n-gram "obama." Fifty of those content object may include a link to a web resource to an entity, such as the official page for Barack Obama, or may be the official web resource of an entity. The other fifty content objects may not include a link to any entity. The social-networking system may uprank the fifty content objects that contain links to web resources for entities or themselves be web resources for entities. The social-networking system may downrank the other fifty content objects.

The ranking may work in the opposite direction as well. That is, if the social-networking system 160 determines that the n-gram is not intended to refer to any entity, it may downrank content objects that refer to an entity and uprank objects that do not refer to an entity. As an example and not by way of limitation, a user may input a search query that states "good morning." The social-networking system may parse this string and determine that "good morning" appears in the mention table. The social networking system may then determine a preliminary link probability by dividing the number of times in the corpus the text "good morning" links to another document by the number of times in the corpus the text "good morning" is mentioned. For example, "good morning" may appear in the corpus 950 times, but may link to another document in the corpus only 15 times. The social networking system 160 may calculate a preliminary link probability as $$P_l = \frac{15}{950} = 0.016.$$

This preliminary link probability may be below the threshold probability. Because of this, the social-networking system 160 may account for the related mentions of "good morning" using formulas (3) or (4) as discussed above. For example, a first instance of "good morning" may link to a first document about the song "Good Morning" by Kanye West. A second instance of "good morning" may link to a second document the 1966 film titled "Good Morning." A third instance of "good morning" may link to a third document about the song "Good Morning" by the Beatles. The social-networking system may add these mentions and links to the link probability calculation using formula (3) and determine that the link probability still falls below the threshold. Thus, after the social-networking system 160 has identified content objects that match a search query for "good morning," it may downrank content objects that link to a web resource for an entity and uprank content objects that do not link to a web resource for an entity. As an example and not by way of limitation, a post that states "Good morning is my favorite song" along with a link to the song "Good Morning" may be downranked because in this post, "Good morning" refers to an entity (a song). However, a photo of a green smoothie that is captioned "Good morning!" may be upranked because it does not contain a link to any other entity. Although this disclosure describes ranking content objects in a particular manner, this disclosure contemplates ranking content objects in any suitable manner.

In particular embodiments, ranking the content objects may be further based on the calculated link probability for each n-gram of the input text. Content objects matching n-grams corresponding to a higher link probability may be ranked higher than content objects matching n-grams corresponding to a lower link probability. This may apply to search queries for which the social-networking system 160 calculates link probabilities for two or more n-grams. As an example and not by way of limitation, a user may input a search query for "Good morning Mr. Obama." The n-grams "good morning" and "obama" may both appear in the mention table. However, as discussed herein, "obama" may have a higher link probability than "good morning." The social-networking system may identify several content objects for this search query. A first identified content object may be an official web resource for Barack Obama. A second identified content object may be an official web resource for the song "Good Morning" by the Beatles. Because "obama" has a higher link probability than "good morning," the first identified content object may be ranked higher than the second identified content object. Although this disclosure describes ranking content objects in a particular manner, this disclosure contemplates ranking content objects in any suitable manner.

In particular embodiments, ranking the content objects may be further based on accessing a social graph 200 comprising nodes and edges connecting the nodes. Each of the edges between two of the nodes may represent a single degree of separation between nodes. The social graph may comprise (1) a first node corresponding to the first user; and (2) a plurality of second nodes corresponding to a plurality of content objects associated with the online social network, respectively. Content objects corresponding to second nodes that have fewer degrees of separation from the first node may be ranked higher than content objects corresponding to second nodes that have more degrees of separation from the first node. As an example and not by way of limitation, if a first identified content object corresponds to a second node that is separated from the first node by a single edge, this content object may be ranked higher than a content object corresponding to a second node that is separated from the first node by two edges, all else being equal. Although this disclosure describes ranking content objects in a particular manner, this disclosure contemplates ranking content objects in any suitable manner.

In particular embodiments, the social-networking system 160 may send instructions for presenting one or more search results. The search results may correspond to one or more of the identified content objects. The search results may be displayed in ranked order based on the rankings of the corresponding content objects.

Figure 7:
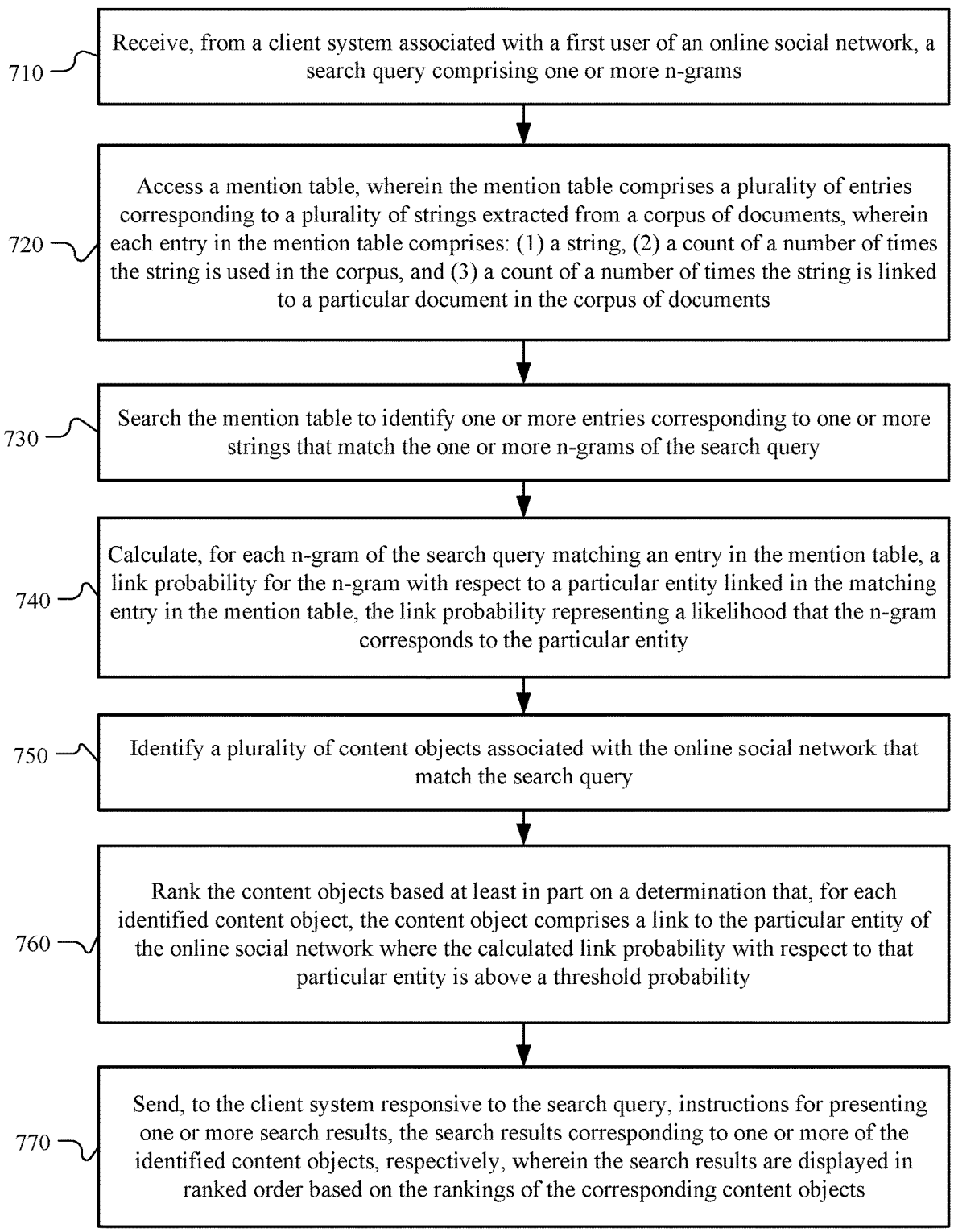
FIG. 7 illustrates an example method for ranking content objects based on link probability.

FIG. 7 illustrates an example method 700 for ranking content objects based on link probability. The method may begin at step 710, where the social-networking system 160 may receive, from a client system associated with a first user of an online social network, a search query comprising one or more n-grams. At step 720, the social-networking system 160 may access a mention table, wherein the mention table comprises a plurality of entries corresponding to a plurality of strings extracted from a corpus of documents, wherein each entry in the mention table comprises: (1) a string, (2) a count of a number of times the string is used in the corpus, and (3) a count of a number of times the string is linked to a particular document in the corpus of documents. At step 730, the social-networking system 160 may search the mention table to identify one or more entries corresponding to one or more strings that match the one or more n-grams of the search query. At step 740, the social-networking system 160 may calculate, for each n-gram of the search query matching an entry in the mention table, a link probability for the n-gram with respect to a particular entity linked in the matching entry in the mention table, the link probability representing a likelihood that the n-gram corresponds to the particular entity. At step 750, the social-networking system 160 may identify a plurality of content objects associated with the online social network that match the search query. At step 760, the social-networking system 160 may rank the content objects based at least in part on a determination that, for each identified content object, the content object comprises a link to the particular entity of the online social network where the calculated link probability with respect to that particular entity is above a threshold probability. At step 770, the social-networking system 160 may send, to the client system responsive to the search query, instructions for presenting one or more search results, the search results corresponding to one or more of the identified content objects, respectively, wherein the search results are displayed in ranked order based on the rankings of the corresponding content objects. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for ranking content objects based on link probability, including the particular steps of the method of FIG. 7, this disclosure contemplates any suitable method for ranking content objects based on link probability including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 8:
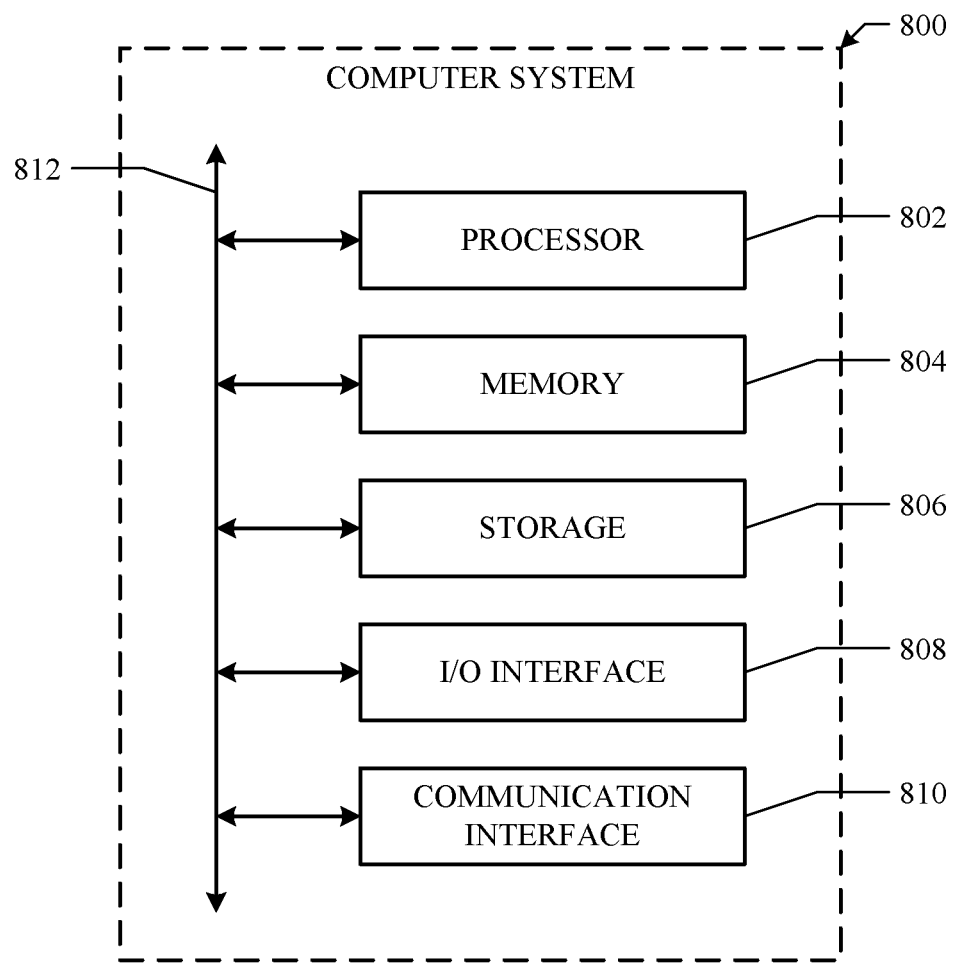
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packetbased communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:

receiving, from a client system associated with a first user of an online social network, a search query comprising one or more n-grams;

accessing a mention table, wherein the mention table comprises a plurality of entries corresponding to a plurality of strings extracted from a corpus of documents, wherein each entry in the mention table comprises: (1) a string, (2) a count of a number of times the string is used in the corpus, and (3) a count of a number of times the string is linked to a particular document in the corpus of documents;

searching the mention table to identify one or more entries corresponding to one or more strings that match the one or more n-grams of the search query;

calculating, for each n-gram of the search query matching an entry in the mention table, a link probability for the n-gram with respect to a particular entity linked in the matching entry in the mention table, the link probability representing a likelihood that the n-gram corresponds to the particular entity, wherein the string is a first string, and the link probability for the n-gram with respect to the particular entity linked in the matching table is $P_l$, wherein $P_l = (N_{links}/N_{mentions})/N_{mentions}$, and wherein: $N_{links}$ is the count of the number of times the first string is linked to the particular document in the corpus of documents, $N_{co-links}$ is a count of a number of times one or more second strings similar to the first string are linked to the particular document in the corpus of documents, and $N_{mentions}$ is the count of the number of times the string is used in the corpus;

identifying a plurality of content objects associated with the online social network that match the search query;

ranking the content objects based at least in part on a determination that, for each identified content object, the content object comprises a link to the particular entity of the online social network where the calculated link probability with respect to that particular entity is above a threshold probability; and sending, to the client system responsive to the search query, instructions for presenting one or more search results, the search results corresponding to one or more of the identified content objects, respectively, wherein the search results are displayed in ranked order based on the rankings of the corresponding content objects.

2. The method of claim 1, wherein each entry in the mention table further comprises a count of a number of times the string is linked in the corpus of documents to a particular entity of the online social network.

3. The method of claim 1, wherein each entry in the mention table further comprises a count of the number of documents in which the string appears in the corpus of documents.

4. The method of claim 1, wherein ranking the content objects is further based on the calculated link probability for each n-gram of the search query, wherein content objects matching n-grams corresponding to a higher link probability are ranked higher than content objects matching n-grams corresponding to a lower link probability.

5. The method of claim 1, wherein ranking the content objects is further based on accessing a social graph comprising a plurality of nodes and a plurality of edges connecting the nodes, each of the edges between two of the nodes representing a single degree of separation between them, the nodes comprising:
a first node corresponding to the first user; and
a plurality of second nodes corresponding to a plurality of content objects associated with the online social network, respectively, wherein content objects corresponding to second nodes that have fewer degrees of separation from the first node are ranked higher than content objects corresponding to second nodes that have more degrees of separation from the first node.

6. The method of claim 1, wherein each entry in the mention table corresponds to a different document in the corpus of documents.

7. The method of claim 1, wherein each entry in the mention table corresponds to a different entity associated with the online social network.

8. The method of claim 1, further comprising, for every link probability for an n-gram with respect to a particular entity linked in the matching table that is above the threshold probability, associating the n-gram with an entity on the online social network that corresponds to the entity linked in the mention table.

9. The method of claim 1, wherein the entries in the mention table are sourced from a third-party database.

10. The method of claim 1, wherein the particular entity linked in the mention table is an entity associated with an online social network with a unique canonical ID.

11. The method of claim 1, wherein the particular entity linked in the mention table is associated with a node in a social graph comprising a plurality of nodes and a plurality of edges, each of the edges between two of the nodes representing a single degree of separation between them.

12. The method of claim 1, wherein the one or more second strings are similar to the first string if the one or more second strings each comprise the first string.

13. The method of claim 1, wherein the one or more second strings are similar to the first string if the one or more second strings are acronyms of the first string.

14. The method of claim 1, wherein the one or more second strings are similar to the first string if the one or more second strings are expansions of the first string.

15. The method of claim 1, wherein the one or more second strings are similar to the first string if the one or more second strings are stemmed versions of the first string.

16. The method of claim 1, wherein the one or more second strings are similar to the first string if the one or more second strings are translated versions of the first string.

17. One or more computer-readable non-transitory storage media embodying software that is operable when executed to:
receive, from a client system associated with a first user of an online social network, a search query comprising one or more n-grams;
access a mention table, wherein the mention table comprises a plurality of entries corresponding to a plurality of strings extracted from a corpus of documents, wherein each entry in the mention table comprises: (1) a string, (2) a count of a number of times the string is used in the corpus, and (3) a count of a number of times the string is linked to a particular document in the corpus of documents;
search the mention table to identify one or more entries corresponding to one or more strings that match the one or more n-grams of the search query;
calculate, for each n-gram of the search query matching an entry in the mention table, a link probability for the n-gram with respect to a particular entity linked in the matching entry in the mention table, the link probability representing a likelihood that the n-gram corresponds to the particular entity, wherein the string is a first string, and the link probability for the n-gram with respect to the particular entity linked in the matching table is $P_l$, wherein $P_l=(N_{links}/N_{mentions})/N_{mentions}$, and wherein: $N_{links}$ is the count of the number of times the first string is linked to the particular document in the corpus of documents, $N_{co\text{-}links}$ is a count of a number of times one or more second strings similar to the first string are linked to the particular document in the corpus of documents, and $N_{mentions}$ is the count of the number of times the string is used in the corpus;
identify a plurality of content objects associated with the online social network that match the search query;
rank the content objects based at least in part on a determination that, for each identified content object, the content object comprises a link to the particular entity of the online social network where the calculated link probability with respect to that particular entity is above a threshold probability; and
send, to the client system responsive to the search query, instructions for presenting one or more search results, the search results corresponding to one or more of the identified content objects, respectively, wherein the search results are displayed in ranked order based on the rankings of the corresponding content objects.

18. A system comprising: one or more processors; and a non-transitory memory coupled to the processors comprising instructions executable by the processors, the processors operable when executing the instructions to:
receive, from a client system associated with a first user of an online social network, a search query comprising one or more n-grams;

access a mention table, wherein the mention table comprises a plurality of entries corresponding to a plurality of strings extracted from a corpus of documents, wherein each entry in the mention table comprises: (1) a string, (2) a count of a number of times the string is used in the corpus, and (3) a count of a number of times the string is linked to a particular document in the corpus of documents;

search the mention table to identify one or more entries corresponding to one or more strings that match the one or more n-grams of the search query;

calculate, for each n-gram of the search query matching an entry in the mention table, a link probability for the n-gram with respect to a particular entity linked in the matching entry in the mention table, the link probability representing a likelihood that the n-gram corresponds to the particular entity, wherein the string is a first string, and the link probability for the n-gram with respect to the particular entity linked in the matching table is $P_l$, wherein $P_l = (N_{links}/N_{mentions})/N_{mentions}$, and wherein: $N_{links}$ is the count of the number of times the first string is linked to the particular document in the corpus of documents, $N_{co-links}$ is a count of a number of times one or more second strings similar to the first string are linked to the particular document in the corpus of documents, and $N_{mentions}$ is the count of the number of times the string is used in the corpus;

identify a plurality of content objects associated with the online social network that match the search query;

rank the content objects based at least in part on a determination that, for each identified content object, the content object comprises a link to the particular entity of the online social network where the calculated link probability with respect to that particular entity is above a threshold probability; and send, to the client system responsive to the search query, instructions for presenting one or more search results, the search results corresponding to one or more of the identified content objects, respectively, wherein the search results are displayed in ranked order based on the rankings of the corresponding content objects.

19. A method comprising, by one or more computing systems:

receiving, from a client system associated with a first user of an online social network, a search query comprising one or more n-grams;

accessing a mention table, wherein the mention table comprises a plurality of entries corresponding to a plurality of strings extracted from a corpus of documents, wherein each entry in the mention table comprises: (1) a string, (2) a count of a number of times the string is used in the corpus, and (3) a count of a number of times the string is linked to a particular document in the corpus of documents;

searching the mention table to identify one or more entries corresponding to one or more strings that match the one or more n-grams of the search query;

calculating, for each n-gram of the search query matching an entry in the mention table, a link probability for the n-gram with respect to a particular entity linked in the matching entry in the mention table, the link probability representing a likelihood that the n-gram corresponds to the particular entity, wherein the link probability for the n-gram with respect to the particular entity linked in the matching table is $P_l$, wherein:

$P_l = N_{links}/N_{mentions}$, $N_{links}$ is the count of the number of times the string is linked to a document in the corpus of documents, and $N_{mentions}$ is the count of the number of times the string is used in the corpus;

identifying a plurality of content objects associated with the online social network that match the search query;

ranking the content objects based at least in part on a determination that, for each identified content object, the content object comprises a link to the particular entity of the online social network where the calculated link probability with respect to that particular entity is above a threshold probability; and sending, to the client system responsive to the search query, instructions for presenting one or more search results, the search results corresponding to one or more of the identified content objects, respectively, wherein the search results are displayed in ranked order based on the rankings of the corresponding content objects.

20. A method comprising, by one or more computing systems:

receiving, from a client system associated with a first user of an online social network, a search query comprising one or more n-grams;

accessing a mention table, wherein the mention table comprises a plurality of entries corresponding to a plurality of strings extracted from a corpus of documents, wherein each entry in the mention table comprises: (1) a string, (2) a count of a number of times the string is used in the corpus, and (3) a count of a number of times the string is linked to a particular document in the corpus of documents;

searching the mention table to identify one or more entries corresponding to one or more strings that match the one or more n-grams of the search query;

calculating, for each n-gram of the search query matching an entry in the mention table, a link probability for the n-gram with respect to a particular entity linked in the matching entry in the mention table, the link probability representing a likelihood that the n-gram corresponds to the particular entity;

identifying a plurality of content objects associated with the online social network that match the search query;

ranking the content objects based at least in part on a determination that, for each identified content object, the content object comprises a link to the particular entity of the online social network where the calculated link probability with respect to that particular entity is above a threshold probability; and sending, to the client system responsive to the search query, instructions for presenting one or more search results, the search results corresponding to one or more of the identified content objects, respectively, wherein the search results are displayed in ranked order based on the rankings of the corresponding content objects, wherein each entry in the mention table further comprises a count of the number of documents in which the string appears in the corpus of documents, wherein the link probability for the n-gram with respect to the particular entity linked in the matching table is $P_l$, wherein:

$P_l = N_{links}/N_{docs}$ and wherein:

$N_{links}$ is the count of the number of times the string is linked to a document in the corpus of documents; and $N_{docs}$ is the count of the number of documents in which the string appears in the corpus of documents.

* * * * *